(12) United States Patent
Lin (10) Patent No.: US 11,579,460 B2
(45) Date of Patent: Feb. 14, 2023

(54) LASER DESPECKLE DEVICE AND OPERATION METHOD OF THE SAME

(71) Applicant: DELTA ELECTRONICS, INC., Taoyuan (TW)

(72) Inventor: Chih-Hao Lin, Taoyuan (TW)

(73) Assignee: DELTA ELECTRONICS, INC., Taoyuan (TW)

(*) Notice: Subject to any disclaimer, the term of this patent is extended or adjusted under 35 U.S.C. 154(b) by 2 days.

(21) Appl. No.: 17/336,273

(22) Filed: Jun. 1, 2021

(65) Prior Publication Data

US 2022/0214555 A1 Jul. 7, 2022

(30) Foreign Application Priority Data

Jan. 5, 2021 (CN) .......................... 202110006687.X (51) Int. Cl.
| | | |
|---|---|---|
| *G03B 21/20* | (2006.01) | |
| *G02B 5/02* | (2006.01) | |
| *G02B 27/48* | (2006.01) | |
| *G02B 26/02* | (2006.01) | |

(52) U.S. Cl.
CPC ........... *G02B 27/48* (2013.01); *G02B 5/0278* (2013.01); *G02B 26/023* (2013.01)

(58) Field of Classification Search
CPC .. G03B 21/204; G03B 21/208; G02B 5/0278; G02B 27/48
See application file for complete search history.

(56) References Cited

U.S. PATENT DOCUMENTS

| | | | |
|---|---|---|---|
| 2009/0185141 A1* | 7/2009 | Chen | .................... H04N 9/3161 353/38 |
| 2010/0253769 A1 | 10/2010 | Coppeta et al. | |
| 2012/0075588 A1 | 3/2012 | Suga et al. | |
| 2016/0041401 A1 | 2/2016 | Suga | |
| 2018/0246340 A1 | 8/2018 | Suga | |
| 2021/0364901 A1* | 11/2021 | Liao | .................... G03B 21/2053 |

FOREIGN PATENT DOCUMENTS

| | | | |
|---|---|---|---|
| CN | 101713908 A | | 5/2010 |
| CN | 106019616 A | | 10/2016 |
| CN | 109061895 A | | 12/2018 |
| TW | 442162 B | | 6/2014 |

* cited by examiner

*Primary Examiner* — Ryan D Howard
(74) *Attorney, Agent, or Firm* — CKC & Partners Co., LLC (57) ABSTRACT

A laser despeckle device includes a light source, a despeckle element, and a plurality of optical transmission modules. The light source is configured to emit a laser light. The despeckle element is disposed along the optical axis of the laser light. The optical transmission modules alternatively disposed at two opposite sides of the despeckle element.

15 Claims, 9 Drawing Sheets

LASER DESPECKLE DEVICE AND OPERATION METHOD OF THE SAME

CROSS-REFERENCE TO RELATED APPLICATION

This application claims priority to Chinese Application Serial Number 202110006687.X, filed Jan. 5, 2021, which is herein incorporated by reference in its entirety.

BACKGROUND

Field of Invention

The present invention relates to a laser despeckle device and operation method of the same.

Description of Related Art

It is common to employees a laser light as the light source of a projector. However, the laser light is highly aligned, polarized, and coherent. Therefore, the laser light source may case speckles.

The current technology may use despeckle element to break the coherence of the laser light. However, after the laser light passes through the despeckle element once, the improvement of the despeckle ability for the display is smaller. If multiple despeckle element are utilized, the volume of the projector may be increased.

Accordingly, it is still a development direction for the industry to provide a laser despeckle device that may reduce the light coherence of the laser light multiple times.

SUMMARY

One aspect of the present disclosure is a laser despeckle device.

In some embodiments, the laser despeckle device includes a light source, a despeckle element, and a plurality of optical transmission modules. The light source is configured to emit a laser light. The despeckle element is disposed along the optical axis of the laser light. The optical transmission modules alternatively disposed at two opposite sides of the despeckle element.

In some embodiments, the despeckle element is a diffusor.

In some embodiments, the laser despeckle device includes an actuator configured to shake the despeckle element.

In some embodiments, the laser despeckle device includes an actuator configured to shake the despeckle element.

In some embodiments, the actuator is configured to translate the despeckle element.

In some embodiments, the laser despeckle device includes a wheel shaft configured to rotate the despeckle element.

In some embodiments, the optical transmission modules include planar reflector or lens.

In some embodiments, the optical transmission modules include curved reflector.

In some embodiments, the optical transmission modules include optical fiber.

Another aspect of the present disclosure is an operation method of the laser despeckle device.

In some embodiments, the operation method of a laser despeckle device includes emitting a first laser light by a light source; passing the first light through a despeckle element to form a second laser light; and transmitting the second laser light by an optical transmission module such that the second laser light pass the despeckle element again.

In some embodiments, the operation method includes shaking or rotating the despeckle element by an actuator.

In some embodiments, the operation method includes rotating the despeckle element by a wheel shaft.

In some embodiments, the optical transmission module includes a reflector and a lens, the operation method further includes focusing and transmitting the second laser light passed through the despeckle element by the reflector and the lens such that the second laser light transmits toward the despeckle element.

In some embodiments, the optical transmission module includes a curved reflector, the operation method further includes focusing and transmitting the second laser light passed through the despeckle element by the curved reflector such that the second laser light transmits toward the despeckle element.

In some embodiments, the optical transmission module includes an optical fiber, the operation method further includes focusing and transmitting the second laser light passed through the despeckle element by the optical fiber such that the second laser light transmits toward the despeckle element.

In the aforementioned embodiments, the laser despeckle device of the present disclosure can make the laser light from the light source pass through single despeckle element multiple times so as to reduce the light coherence. As such, cost for disposing the despeckle elements can be reduced and the speckle of the laser projector can be reduced.

BRIEF DESCRIPTION OF THE DRAWINGS

The invention can be more fully understood by reading the following detailed description of the embodiment, with reference made to the accompanying drawings as follows.

DETAILED DESCRIPTION

Reference will now be made in detail to the present embodiments of the invention, examples of which are illustrated in the accompanying drawings. Wherever possible, the same reference numbers are used in the drawings and the description to refer to the same or like parts.

Figure 1:
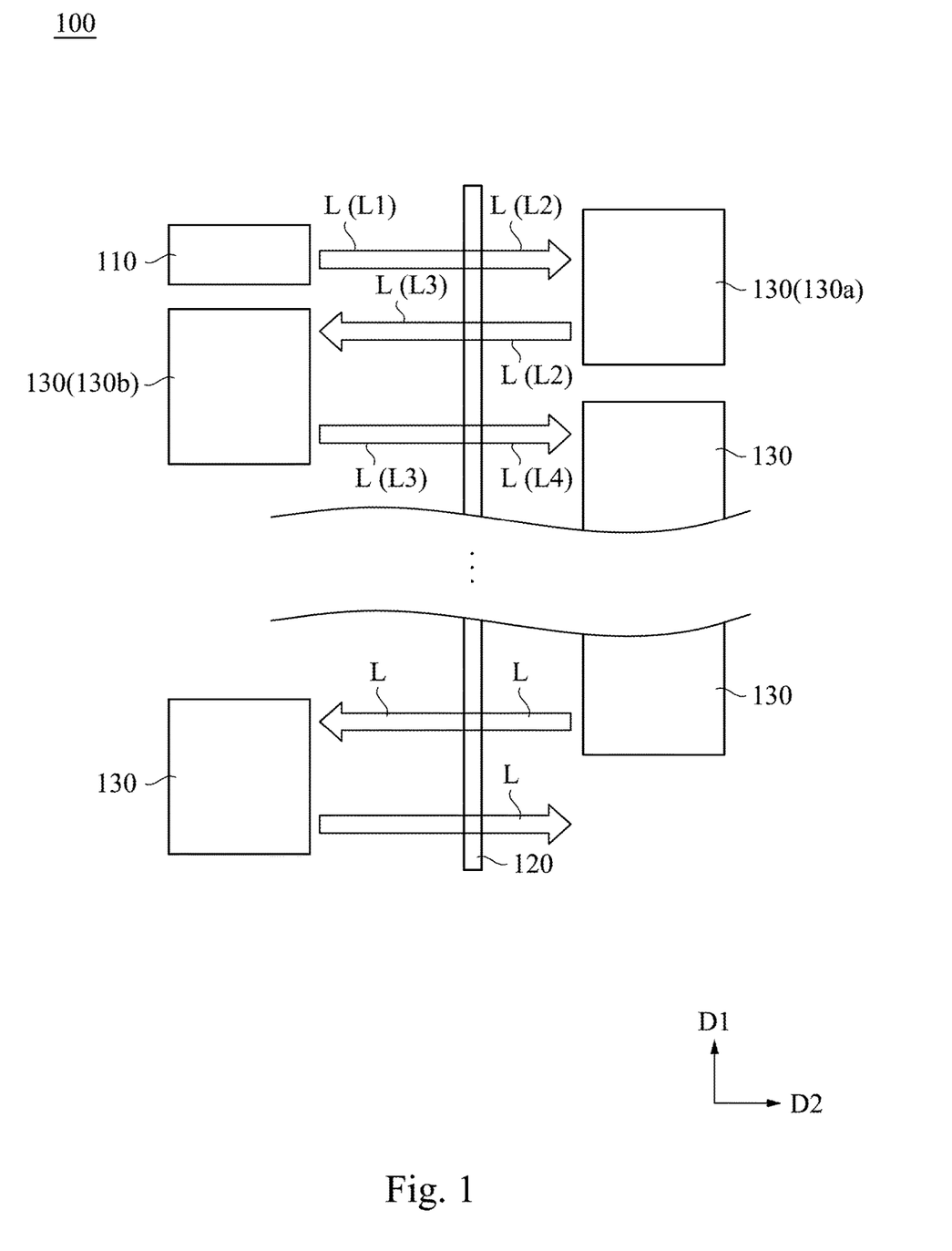
FIG. 1 is a schematic of a laser despeckle device according to one embodiment of the present disclosure.

FIG. 1 is a schematic of a laser despeckle device 100 according to one embodiment of the present disclosure. The laser despeckle device 100 includes a light source 110, a despeckle element 120, and a plurality of optical transmission modules 130. The light source 110 is configured to emit a laser light L. The despeckle element 120 is disposed along the optical axis of the laser light I. The optical transmission modules 130 are configured to transmit the laser light L such that the laser light L transmits toward the despeckle element 120. The optical transmission modules 130 are disposed at two opposite sides of the despeckle element 120. The optical transmission modules 130 are alternatively disposed along a first direction D1 such that the laser light L sequentially is transmitted toward the despeckle element 120 many times. As such, the light coherence of the laser light L passed through the despeckle element 120 many times can be reduced. The laser despeckle device 100 can be applied in a laser projector so as to reduce the speckle occurred in the display figure.

As shown in FIG. 1, the laser despeckle device 100 emits a first laser light L1 along a second direction D2 by a light source 110. The first laser light L1 passes through the despeckle element 120 to form a second laser light L2. Subsequently, the optical transmission module 130a focuses and transmits the second laser light L2 such that the second laser light L2 pass through the despeckle element 120 again. The second laser light L2 transmitting along the second direction D2 was focused and transmitted toward the reversed direction of the second direction D2. The second laser light L2 passes through the despeckle element 120 so as to form the third laser light L3.

In the present embodiment, the despeckle element 120 is a diffusor. The diffusor can be a prism, a structure with dot print on the surface, or light guide material embedded with particles. The light coherence can be broken by the despeckle element 120 through light scattering or light diffuse reflection of the incident light. That is, after the collimated first laser light L1 passes through the despeckle element 120, the light was partially scattered or diffuse reflected towards different directions. In other words, the second laser light L2 that passed through the despeckle element 120 once has a lower coherence than the first laser light L1, and the third laser light L3 that passed through the despeckle element 120 twice has a lower coherence than the second laser light L2.

The third laser light L3 can be focused and transmitted continuously by another optical transmission modules 130b to pass through the despeckle element 120. Therefore, the light coherence of the third light can be reduced again by the despeckle element 120, and a fourth laser light L4 is formed. Subsequently, the light coherence of the fourth laser light L4 can be further reduced by the other optical transmission modules 130 sequentially.

Accordingly, the laser despeckle device 100 of the present disclosure can make the laser light L from the light source 110 pass through single despeckle element 120 multiple times so as to reduce the light coherence. As such, cost for disposing the despeckle elements 120 can be reduced. In addition, if multiple despeckle elements 120 are employed (i.e., many despeckle elements 120 are arranged along the second direction D2), it is required to provide more space for the light passed through the despeckle elements 120 to transmit through a distance so as to increase the scatter angle. As a result, a distance is required between adjacent two of the despeckle elements 120, such that the volume of the laser despeckle device 100 will be increased. The laser despeckle device 100 of the present disclosure can transmit the laser light L toward single despeckle element 120 multiple times by the optical transmission modules 130 so as to reduce the light coherence of the laser light L and reduce the speckle of the laser projector.

Figure 2:
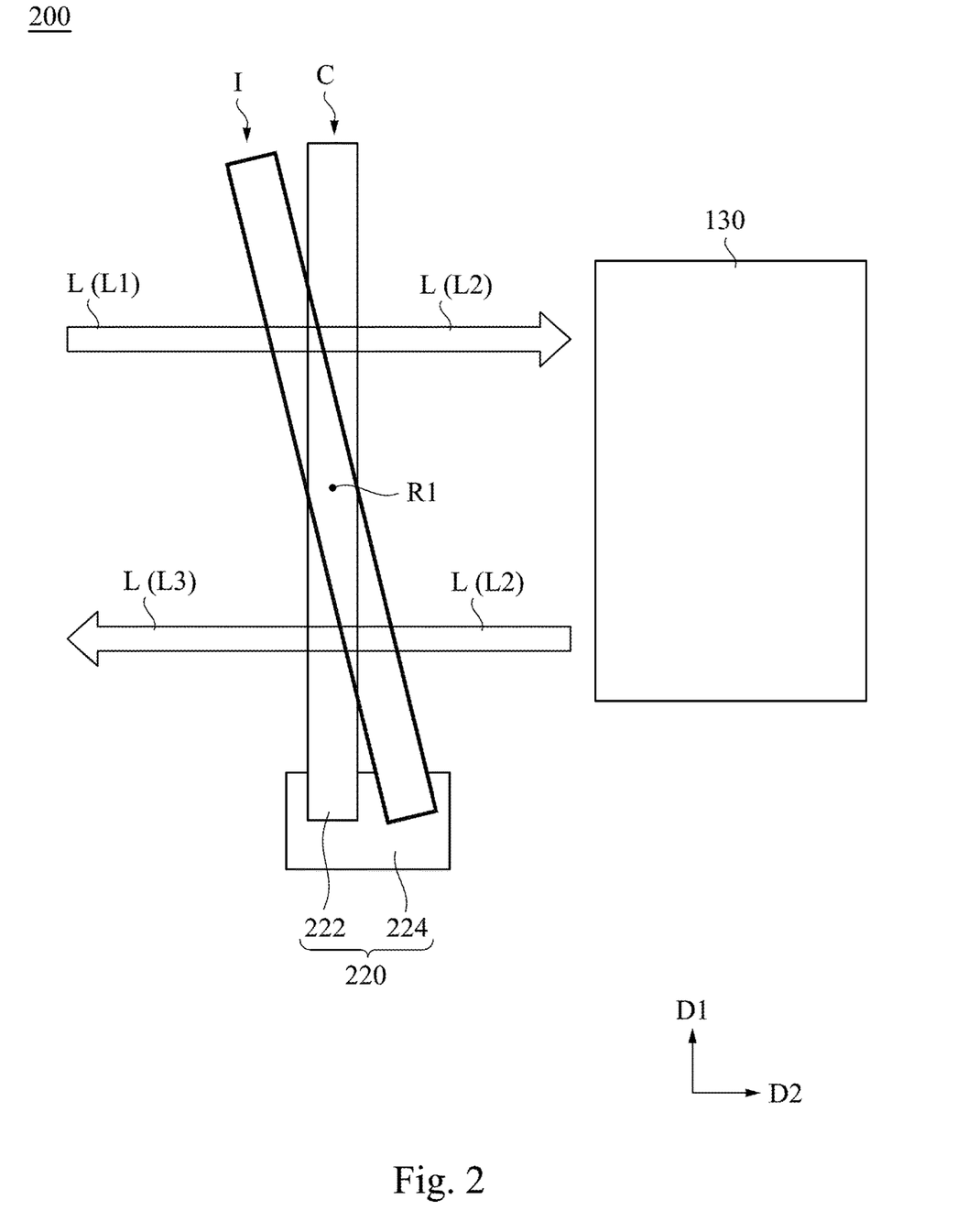
FIG. 2 is a schematic of a laser despeckle device according to another embodiment of the present disclosure.

FIG. 2 is a schematic of a laser despeckle device 200 according to another embodiment of the present disclosure.

The laser despeckle device 200 is similar to the laser despeckle device 100 as shown in FIG. 1, and the difference is that the despeckle element 220 of the laser despeckle device 200 includes a diffusor 222 and an actuator 224. The actuator 224 is configured to shake the diffusor 222. In the present embodiment, the actuator 224 can be disposed at an edge of the despeckle element 220 so as to slant the despeckle element 220. For example, the despeckle element 220 may be slanted by rotating from the center position C relative to the axis R1, and the despeckle element 220 can be rotated back to the center position C. As such, the possibility for the laser light L to be scattered or diffuse reflected toward different directions after passing through the despeckle element 220 can be increased.

In the present embodiment, an example of which the laser light L passing through the despeckle element 220 twice is demonstrated. As shown in FIG. 2, when the first laser light L1 passes through the despeckle element 220, the despeckle element 220 is at the center position C. When the second laser light L2 is transmitted through the despeckle element 220 by the optical transmission modules 130, the despeckle element 220 may be at the slant position I. In other embodiments, the despeckle element 220 may be slanted back and forth between two sides of the center position C. Therefore, the light coherence of the laser light can be reduced by using the actuator 224 and the diffusor 222. The laser despeckle device 200 and the laser despeckle device 100 have the same advantages, and the description is not repeated hereinafter.

Figure 3:
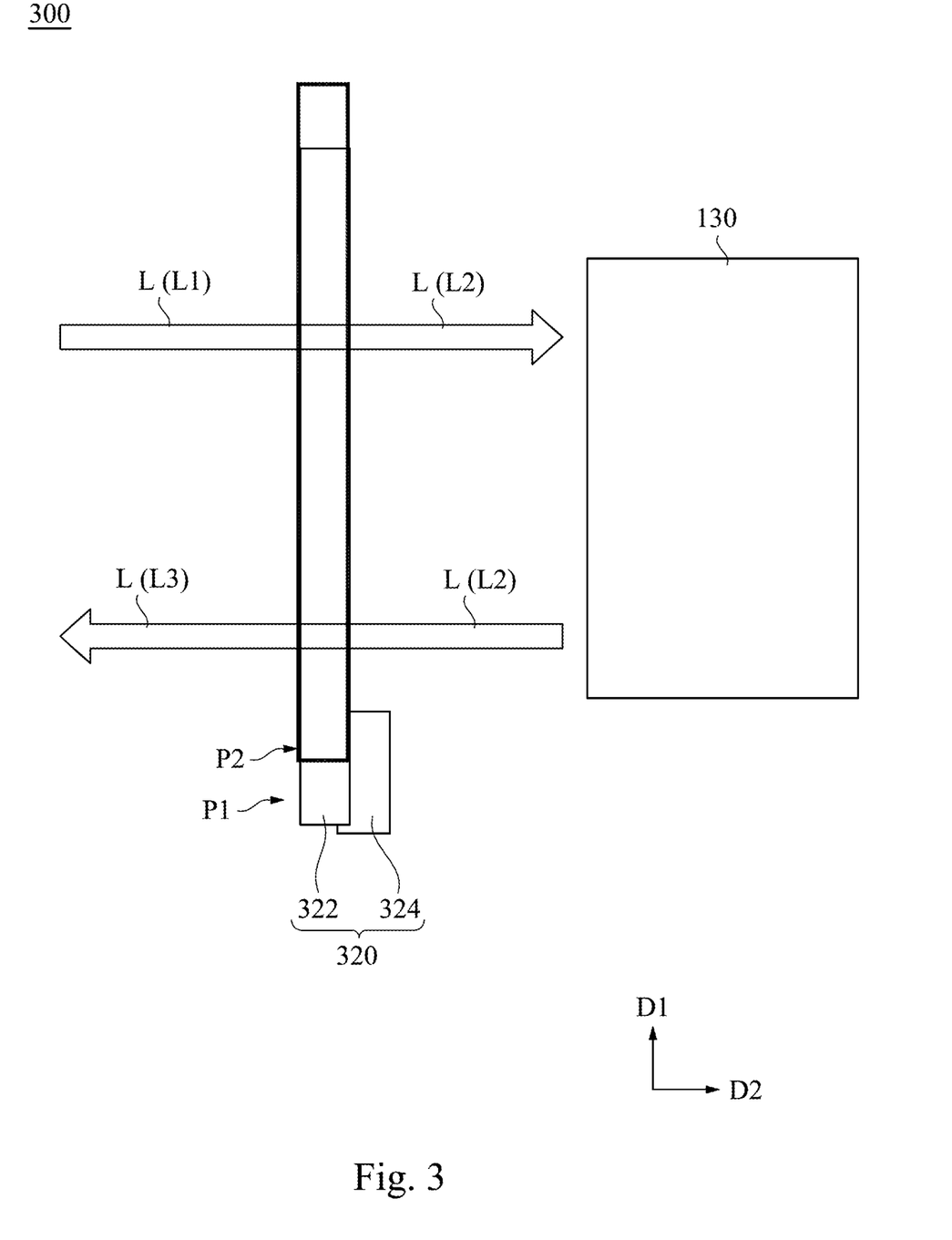
FIG. 3 is a schematic of a laser despeckle device according to another embodiment of the present disclosure.

FIG. 3 is a schematic of a laser despeckle device 300 according to another embodiment of the present disclosure. The laser despeckle device 300 is similar to the laser despeckle device 200, and the difference is that the despeckle element 320 of the laser despeckle device 300 includes the diffusor 322 and an actuator 324. The actuator 324 is configured to translate the diffusor 322. As shown in FIG. 3, the actuator 324 can drive the diffusor 322 to translate along a plane that is perpendicular to the second direction D2 such as from the position P1 to the position P2. As such, the possibility for the laser light L to be scattered or diffuse reflected toward different directions after passing through the diffusor 322 can be increased. In addition, movement along the plane that is perpendicular to the second direction D2 won't affect the focus position of the laser light L along the direction of the optical axis (that is the second direction D2), thereby the optical precision won't be affected. Therefore, the light coherence of the laser light can be reduced by using the actuator 324 and the diffusor 322. The laser despeckle device 300 and the laser despeckle device 200 have the same advantages, and the description is not repeated hereinafter.

Figure 4:
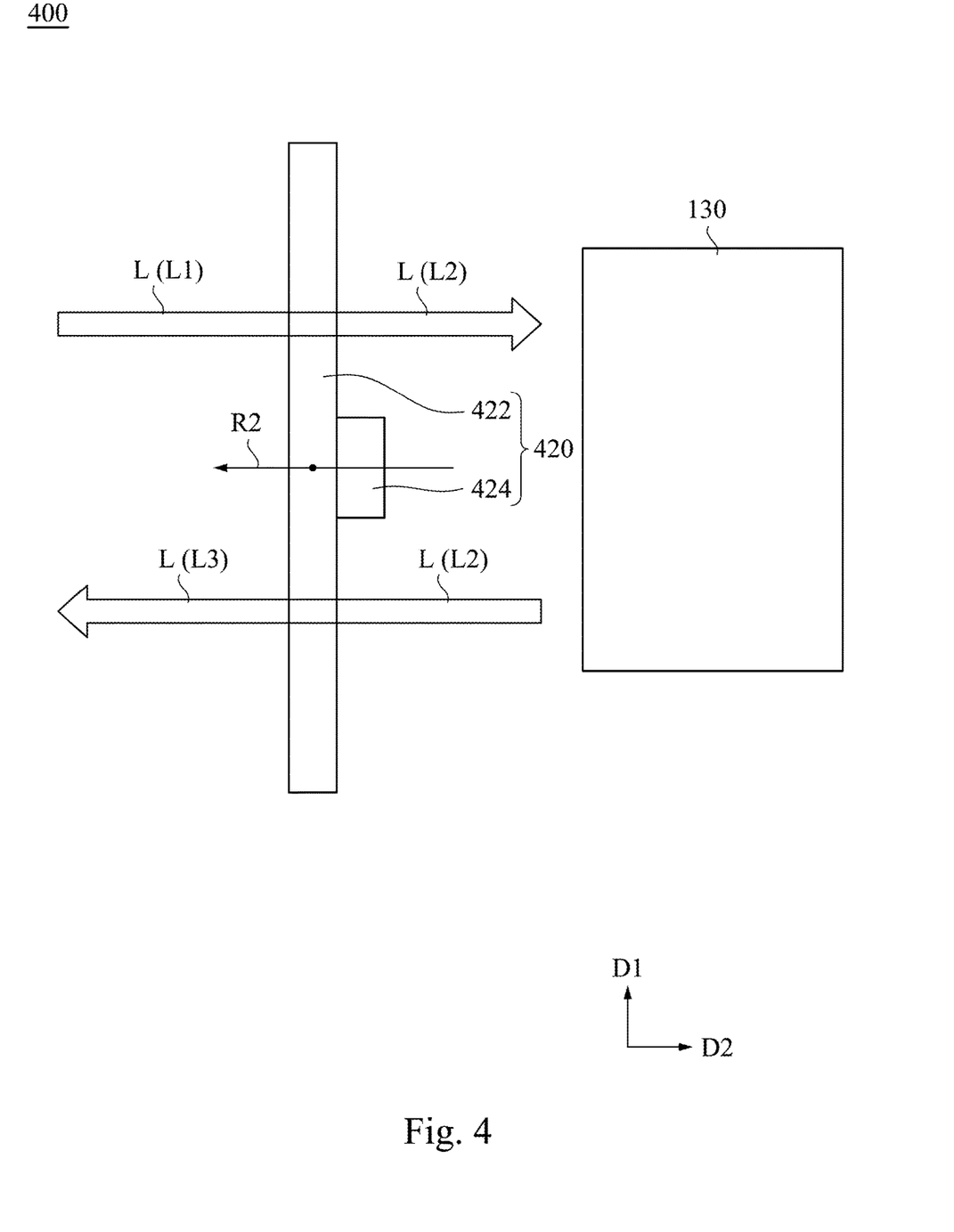
FIG. 4 is a schematic of a laser despeckle device according to another embodiment of the present disclosure.

FIG. 4 is a schematic of a laser despeckle device 400 according to another embodiment of the present disclosure. The laser despeckle device 400 is similar to the laser despeckle device 100 as shown in FIG. 1, and the difference is that the despeckle element 420 of the laser despeckle device 400 further includes a wheel shaft 424. The wheel shaft 424 is disposed at a center of the diffusor 422, and the wheel shaft 424 is configured to rotate the diffusor 422 along the axis R2. The direction of the axis R2 is parallel with the second direction D2. As such, the possibility for the laser light L to be scattered or diffuse reflected toward different directions after passing through the diffusor 422 can be increased. Therefore, the light coherence of the laser light can be reduced by using the wheel shaft 424 and the diffusor 422. The laser despeckle device 400 and the laser despeckle device 100 have the same advantages, and the description is not repeated hereinafter.

Figure 5:
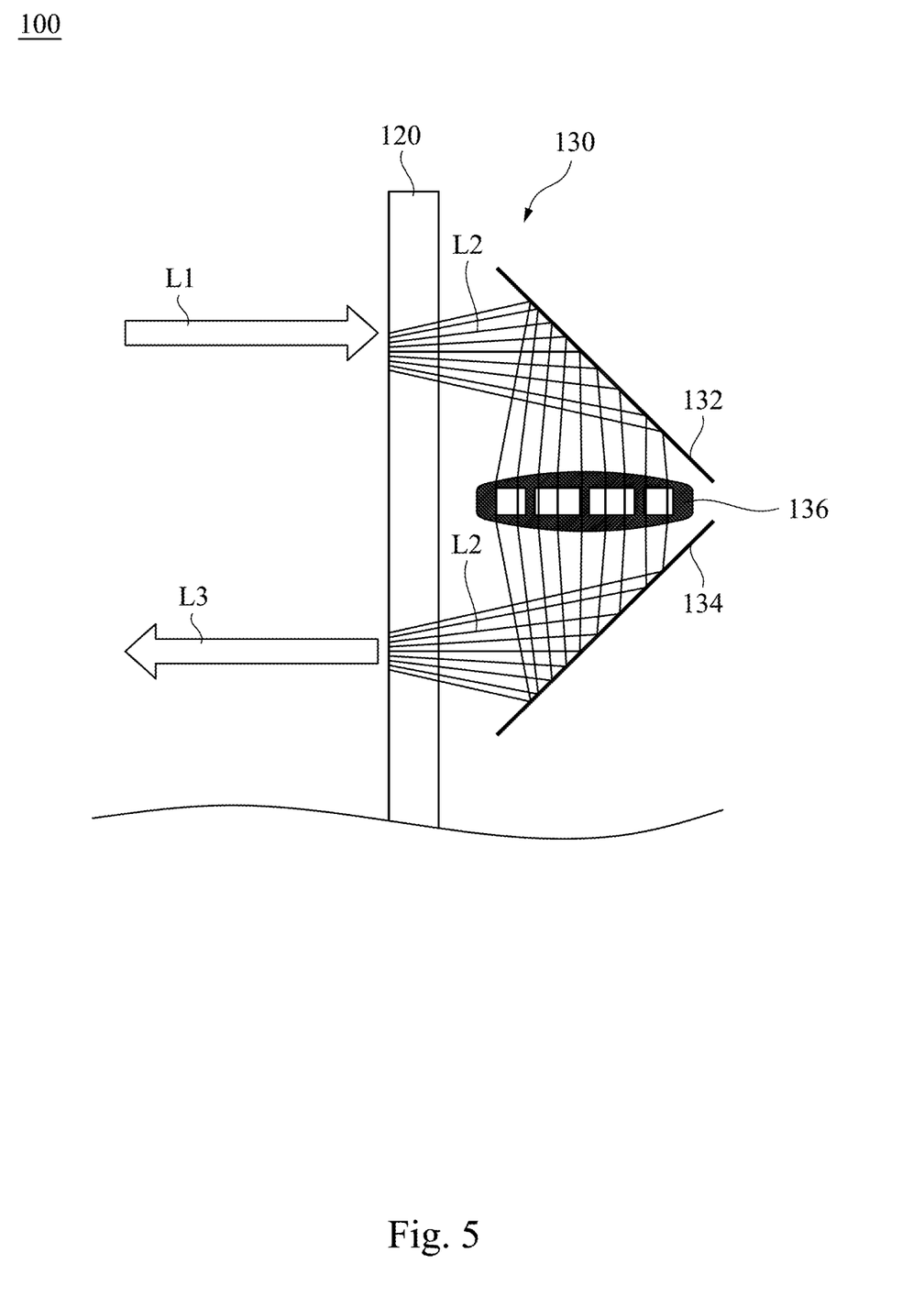
FIG. 5 is a partial schematic of the laser despeckle device in FIG. 1.

FIG. 5 is a partial schematic of the laser despeckle device 100 in FIG. 1. The optical transmission modules 130 include planar reflectors 132, 134, and lens 136 located between the planar reflectors 132, 134. In the present embodiment, the second laser light L2 is reflected by the planar reflector 132 toward the lens 136, and the second laser light L2 is focused by the lens 136 and reflected by another planar reflector 134 toward the despeckle element 120. Therefore, the lens 136 can focus the second laser light L2 so as to prevent the second laser light L2 from loss during the process of the light transmission. The light coherence of the second laser light L2 passed through the despeckle element 120 toward the second direction D2 can be reduced by passing through the despeckle element 120 again through the optical transmission modules 130.

Figure 6:
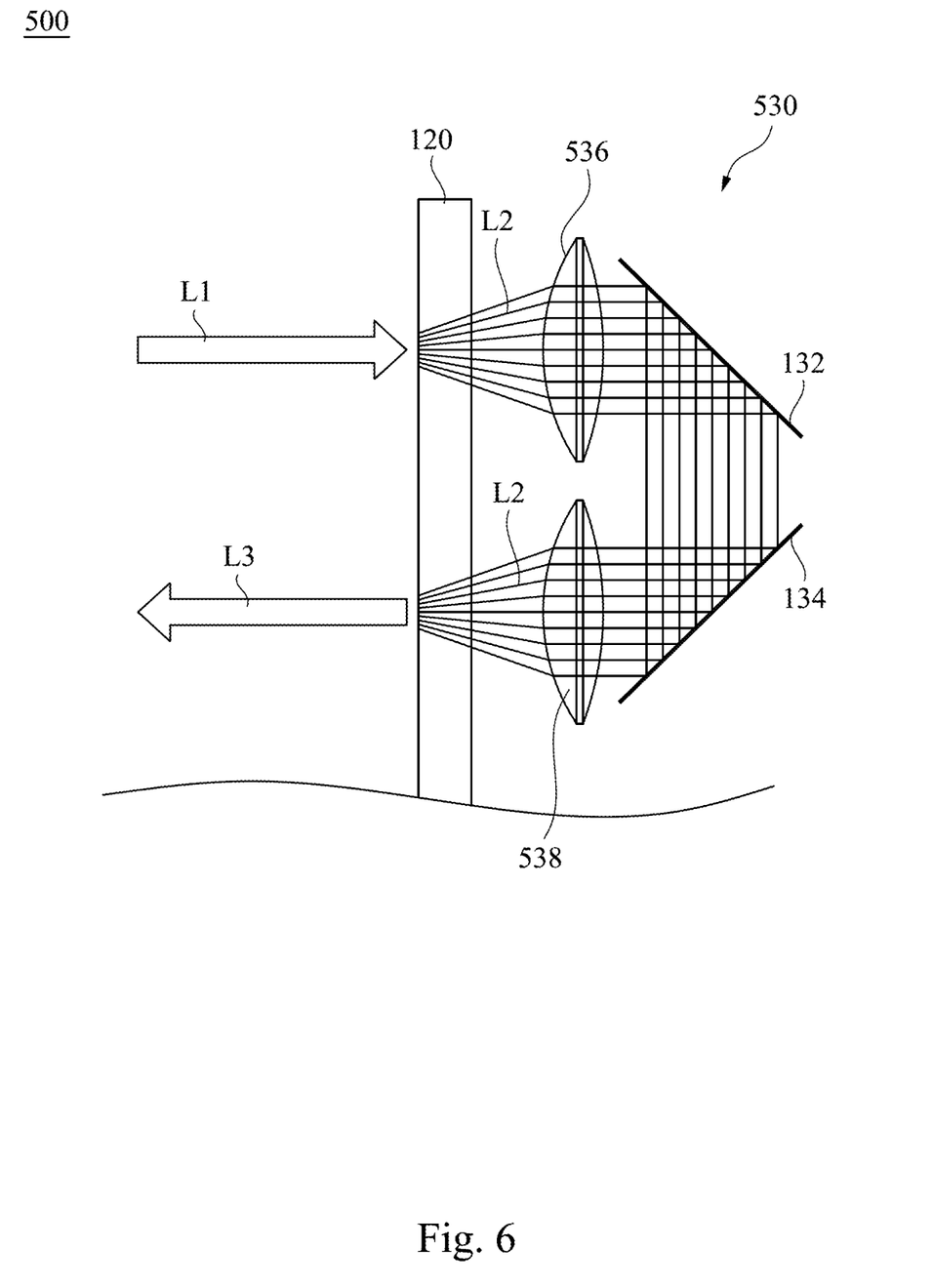
FIG. 6 is a partial schematic of a laser despeckle device according to another embodiment of the present disclosure.

FIG. 6 is a partial schematic of a laser despeckle device 500 according to another embodiment of the present disclosure. The laser despeckle device 500 is similar to the despeckle device 100 shown in FIG. 5, and the difference is that the optical transmission modules 530 of the laser despeckle device 500 includes two planar reflector 132, 134 and two lenses 536, 538. The lens 536 is located between the despeckle element 120 and the planar reflector 132. The lens 538 is located between the despeckle element 120 and the planar reflector 134. In the present embodiment, the second laser light L2 is focus by the lens 536 and is transmitted toward the planar reflector 132. The second laser light L2 is reflected by the planar reflector 132 toward another planar reflector 134. The second laser light L2 is then reflected by the planar reflector 134 toward the lens 538, and the second laser light L2 is focused by the lens 538 and transmitted toward the despeckle element 120. Therefore, the lenses 536, 538 may focus the second laser light L2 so as to prevent the second laser light L2 from loss during the process of the light transmission. The light coherence of the second laser light L2 passed through the despeckle element 120 toward the second direction D2 can be reduced by passing through the despeckle element 120 again through the optical transmission modules 530. In addition, the despeckle element 120 of the laser despeckle device 500 may be the despeckle elements 220, 320, 420 as shown in FIGS. 2 to 4.

Figure 7:
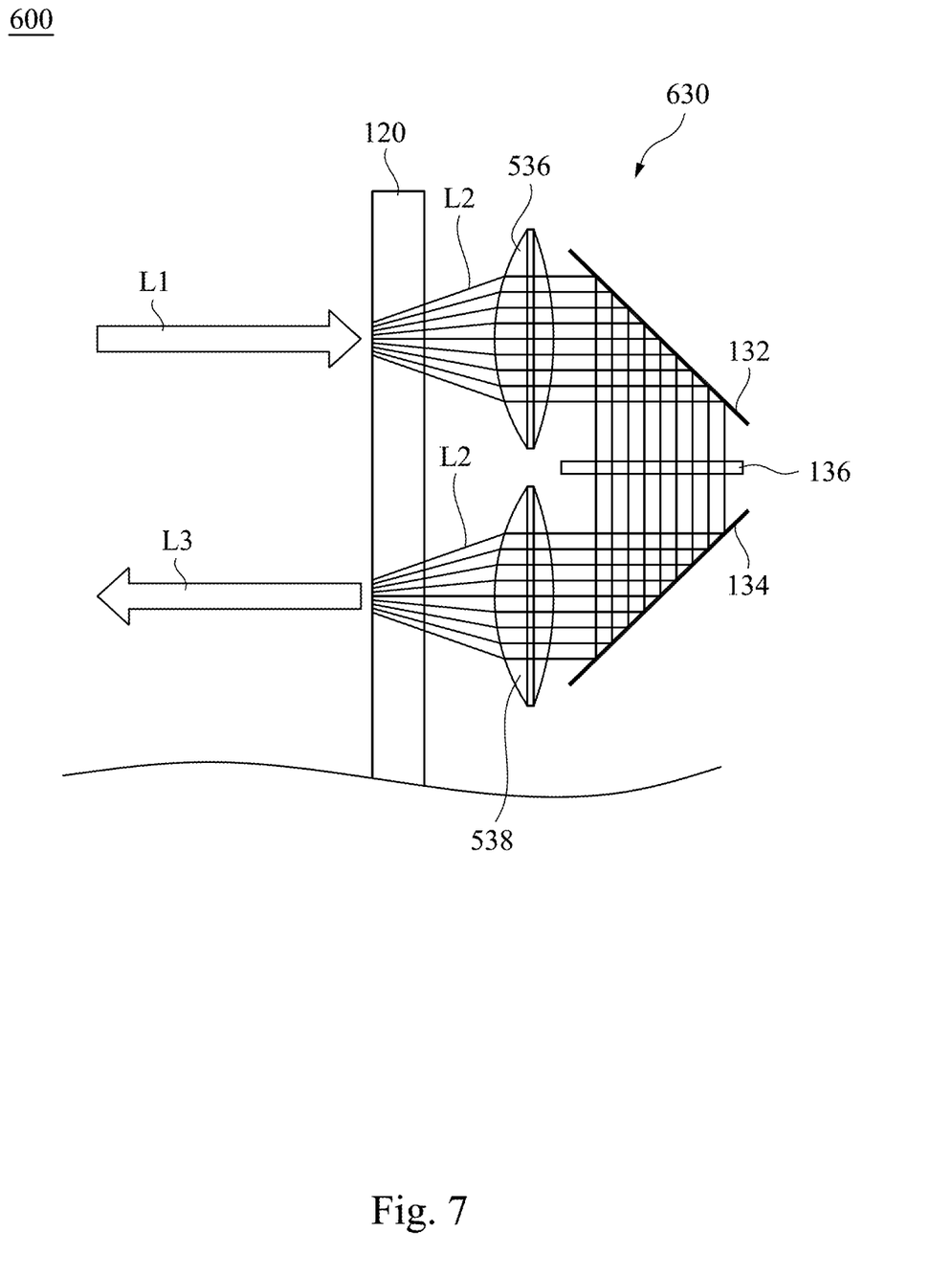
FIG. 7 is a partial schematic of a laser despeckle device according to another embodiment of the present disclosure.

FIG. 7 is a partial schematic of a laser despeckle device 600 according to another embodiment of the present disclosure. The laser despeckle device 600 is similar to the despeckle device 500 shown in FIG. 6, and the difference is that the optical transmission modules 630 of the laser despeckle device 600 includes two planar reflector 132, 134, the lens 136 as shown in FIG. 5, and the lenses 536, 538 as shown in FIG. 6. In other words, the second laser light L2 can be focused and transmitted multiple times by the lens 136 located between the planar reflectors 132, 134 and the lenses 536, 538 located between the despeckle element 120 and the planar reflectors 132, 134 of the optical transmission modules 630 of the laser despeckle device 600 so as to prevent the second laser light L2 from loss during the process of the light transmission. The light coherence of the second laser light L2 passed through the despeckle element 120 toward the second direction D2 can be reduced by passing through the despeckle element 120 again through the optical transmission modules 630. In addition, the despeckle element 120 of the laser despeckle device 600 may be the despeckle elements 220, 320, 420 as shown in FIGS. 2 to 4.

Figure 8:
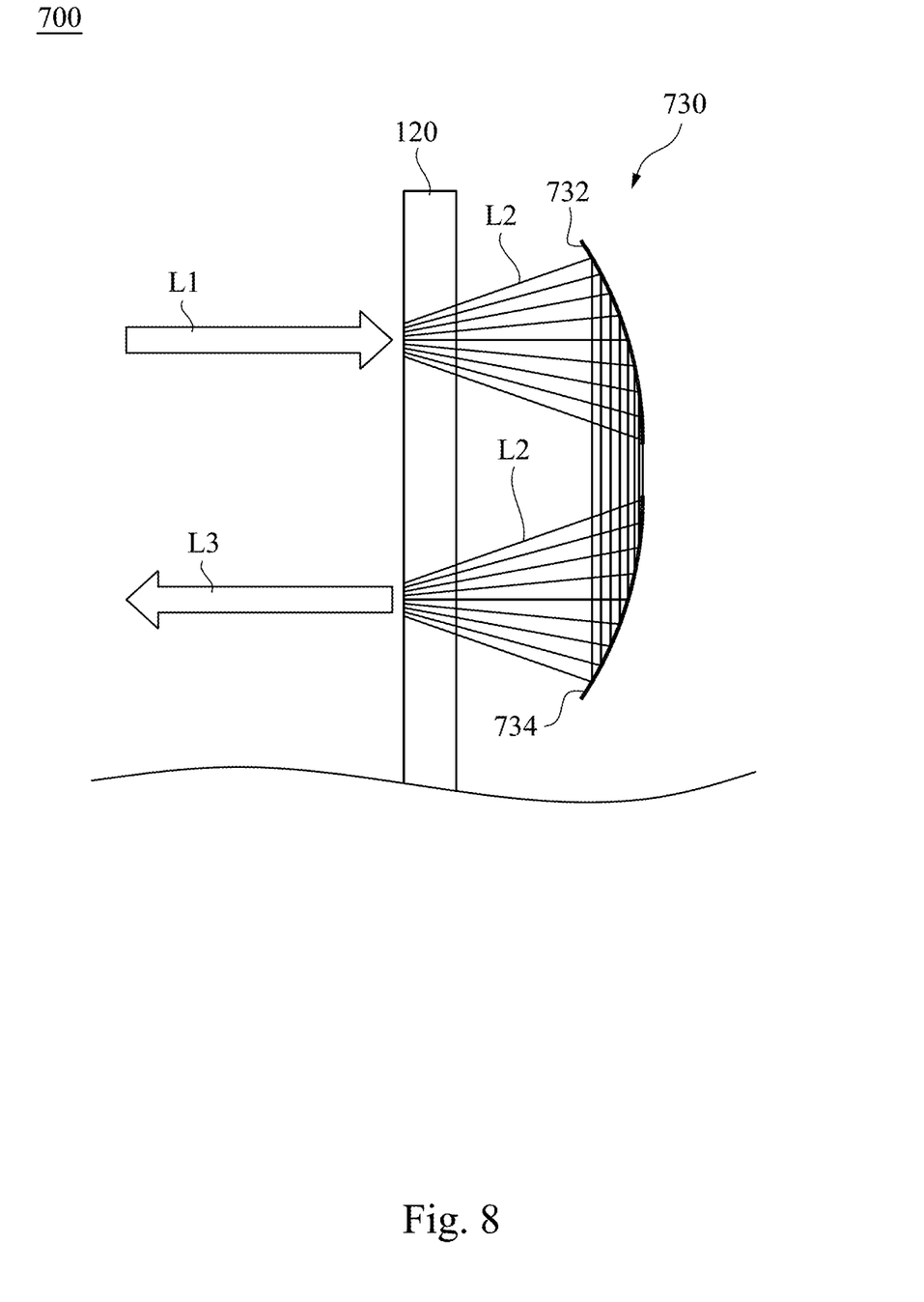
FIG. 8 is a partial schematic of a laser despeckle device according to another embodiment of the present disclosure.

FIG. 8 is a partial schematic of a laser despeckle device 700 according to another embodiment of the present disclosure. The optical transmission modules 730 of the laser despeckle device 700 includes curved reflectors 732, 734. The second laser light L2 is focused by the curved reflector 732 and reflected as directional light toward another curved reflector 734. The second laser light L2 is focused and reflected by the curved reflector 734 toward the despeckle element 120. In other words, the curved reflectors 732, 734 may focus the second laser light L2 so as to prevent the second laser light L2 from loss during the process of the light transmission. The light coherence of the second laser light L2 passed through the despeckle element 120 toward the second direction D2 can be reduced by passing through the despeckle element 120 again through the optical transmission modules 730. In addition, the despeckle element 120 of the laser despeckle device 700 may be the despeckle elements 220, 320, 420 as shown in FIGS. 2 to 4.

Figure 9:
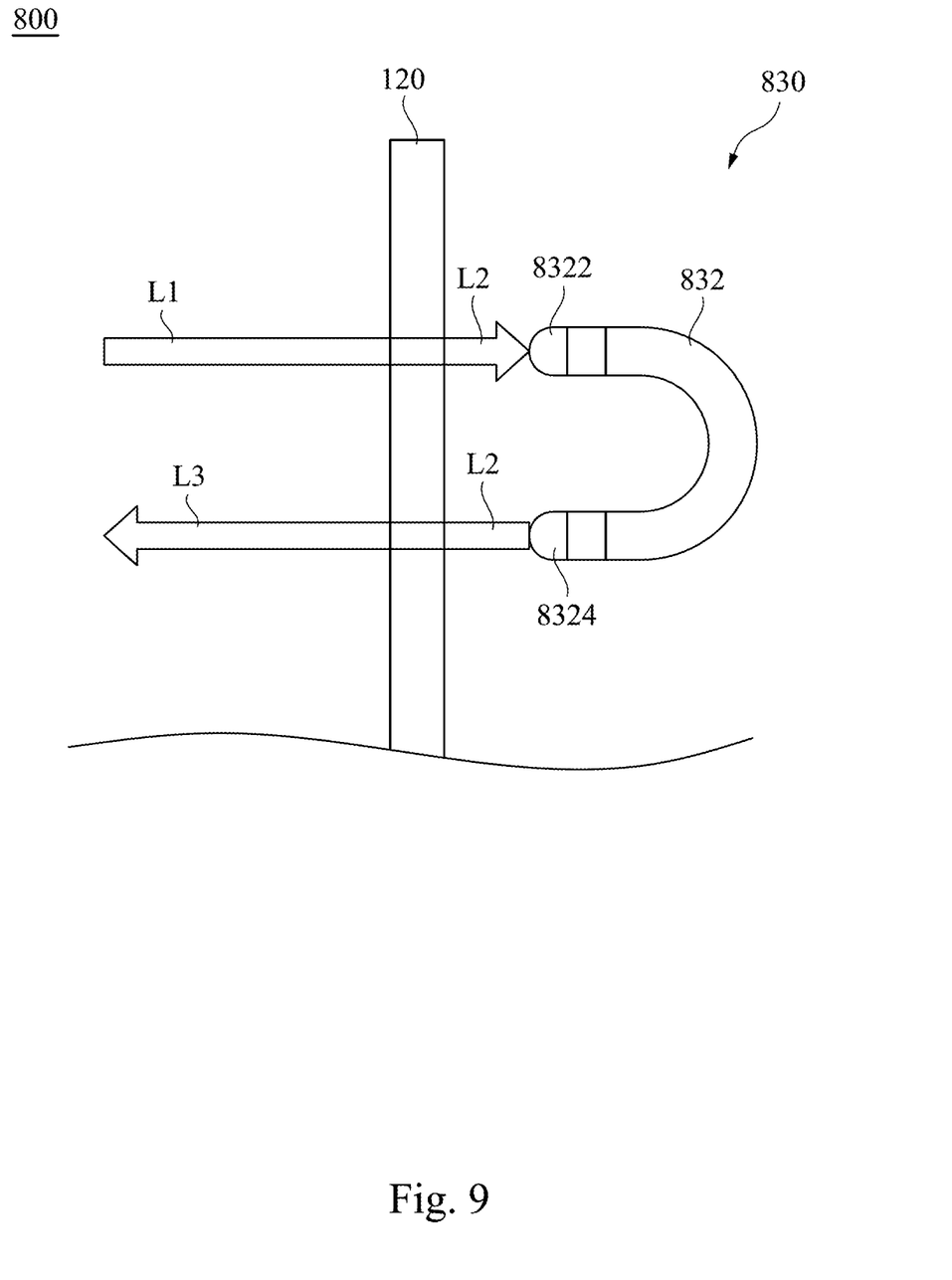
FIG. 9 is a partial schematic of a laser despeckle device according to another embodiment of the present disclosure.

FIG. 9 is a partial schematic of a laser despeckle device according to another embodiment of the present disclosure. The optical transmission modules 830 of the laser despeckle device 800 includes optical fiber 832. After the second laser light L2 enters one end 8322 of the optical fiber 832, the second laser light L2 is focused by the focusing elements in the optical fiber 832 and is transmitted to another end 8324 of the optical fiber 832. The second laser light L2 is transmitted from the end 8324 toward the despeckle element 120. Therefore, the optical fiber 832 may focus the second laser light L2 so as to prevent the second laser light L2 from loss during the process of the light transmission. The light coherence of the second laser light L2 passed through the despeckle element 120 toward the second direction D2 can be reduced by passing through the despeckle element 120 again through the optical transmission modules 830. In addition, the despeckle element 120 of the laser despeckle device 800 may be the despeckle elements 220, 320, 420 as shown in FIGS. 2 to 4.

As described above, the laser despeckle device of the present disclosure can make the laser light from the light source pass through single despeckle element multiple times so as to reduce the light coherence. As such, cost for disposing the despeckle elements can be reduced and the speckle of the laser projector can be reduced.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An laser despeckle device, comprising:
a light source configured to emit a laser light;
a despeckle element disposed along the optical axis of the laser light; and
a plurality of optical transmission modules alternatively disposed at first and second sides of the despeckle element, wherein the first side faces away from the second side, one of the optical transmission modules disposed at the first side of the despeckle element is laterally aligned with a gap between another two of the optical transmission modules that are adjacent to each other and disposed at the second side of the despeckle element.

2. The laser despeckle device of claim 1, wherein the despeckle element is a diffusor.

3. The laser despeckle device of claim 1, further comprising:
an actuator configured to shake the despeckle element.

4. The laser despeckle device of claim 3, wherein the actuator is configured to translate the despeckle element.

5. The laser despeckle device of claim 3, wherein the actuator is configured to slant the despeckle element.

6. The laser despeckle device of claim 1, further comprising:
a wheel shaft configured to rotate the despeckle element.

7. The laser despeckle device of claim 1, wherein the optical transmission modules comprise planar reflector or lens.

8. The laser despeckle device of claim 1, wherein the optical transmission modules comprise curved reflector.

9. The laser despeckle device of claim 1, wherein the optical transmission modules comprise optical fiber.

10. An operation method of a laser despeckle device, comprising:
emitting a first laser light by a light source that is at a first side of a despeckle element;
passing the first light through the despeckle element to form a second laser light;
transmitting the second laser light by one of first optical transmission modules that are disposed at a second side of the despeckle element, such that the second laser light pass the despeckle element again to form a third laser light, wherein the first side of the despeckle element faces away from the second side of the despeckle element; and
transmitting the third laser light by a second optical transmission module at the first side of the despeckle element, wherein the second optical transmission module is laterally aligned with a gap between two of the first optical transmission modules that are adjacent to each other disposed at the second side of the despeckle element.

11. The operation method of claim 10, further comprising:
shaking or rotating the despeckle element by an actuator.

12. The operation method of claim 10, further comprising:
rotating the despeckle element by a wheel shaft.

13. The operation method of claim 10, wherein each of the first and second optical transmission modules comprises a reflector and a lens, the operation method further comprises:
focusing and transmitting the second laser light passed through the despeckle element by the reflector and the lens such that the second laser light transmits toward the despeckle element.

14. The operation method of claim 10, wherein each of the first and second optical transmission modules comprises a curved reflector, the operation method further comprises:
focusing and transmitting the second laser light passed through the despeckle element by the curved reflector such that the second laser light transmits toward the despeckle element.

15. The operation method of claim 10, wherein each of the first and second optical transmission modules comprises an optical fiber, the operation method further comprises:
focusing and transmitting the second laser light passed through the despeckle element by the optical fiber such that the second laser light transmits toward the despeckle element.

* * * * *